United States Patent
Bowen

[11] 3,828,699
[45] Aug. 13, 1974

[54] ARMOUR
[75] Inventor: Dennis Herbert Bowen, North Stoke, England
[73] Assignee: United Kingdom Atomic Energy Authority, London, England
[22] Filed: Aug. 18, 1972
[21] Appl. No.: 281,779

[30] Foreign Application Priority Data
Aug. 19, 1971 Great Britain.................. 39075/71

[52] U.S. Cl..................... 109/80, 161/404, 75/206,
[51] Int. Cl........................................ 89/36 A
[58] Field of Search ............ 109/49.5, 58.5, 79, 80, 109/81-84; 161/404, 37, 38, 170, 193, 194, 90; 29/182.7; 89/36 A; 106/43, 44; 2/2.5; 75/202, 203, 206

[56] References Cited
UNITED STATES PATENTS

| | | | |
|---|---|---|---|
| 3,444,033 | 5/1969 | King | 161/38 |
| 3,633,520 | 1/1972 | Stiglich | 109/82 |
| 3,649,342 | 3/1972 | Bartlett | 161/404 X |
| 3,681,187 | 8/1972 | Bowen | 161/170 |
| 3,684,631 | 8/1972 | Dunbar | 109/80 X |
| 3,691,000 | 9/1972 | Kalnin | 161/170 X |
| 3,700,534 | 10/1972 | Cook | 109/80 X |

FOREIGN PATENTS OR APPLICATIONS

| | | | |
|---|---|---|---|
| 1,140,841 | 12/1962 | Germany | 89/36 A |
| 1,081,464 | 8/1967 | Great Britain | 161/404 |

Primary Examiner—Dennis L. Taylor
Attorney, Agent, or Firm—Larson, Taylor & Hinds

[57] ABSTRACT

An armour comprising a composite material consisting of a mixture of hard particulate material and fibrous material dispersed throughout a matrix material, the distribution of the particulate and fibrous materials through the matrix material being such that the properties of the composite material change progressively from predominantly hard at one surface to predominantly resilient at another surface, and a method of manufacturing the armour in which a plurality of sheets of material the compositions of which may vary so far as the ratio of particulate to fibrous material is concerned are stacked together and hot-pressed at a temperature sufficient to cause the matrix material to flow so as to form a unified voidfree composite material the properties of which vary progressively throughout the material from predominantly hard at one surface to predominantly resilient at the opposite surface.

10 Claims, 1 Drawing Figure 3,828,699
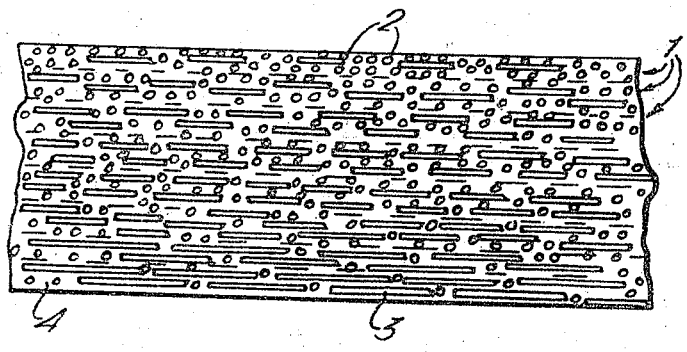

ARMOUR

The present invention relates to armour and more specifically to armour incorporating ceramic materials.

An effective type of armour has a hard surface layer which is backed by a more resilient material. In use the hard surface is made to face the direction from which projectiles are anticipated. The hard surface layer acts to break up any projectiles hitting the armour and the more resilient backing material absorbs the resulting fragments of the projectiles and the front surface layer, should it be shattered, together with the energy of impact of the projectiles. For some purposes such as the protection of aeroplanes and personnel, weight is an important consideration, and for these purposes ceramic materials are preferred for the hard layer because such materials are both hard and of low density compared with the steels used to form conventional armour plate. At present, ceramic based armour is made of a single phase ceramic layer to which is adhesively bonded a backing layer made of a fibre reinforced plastics material. However, such armour has proved to be not entirely satisfactory because the differences in the physical properties of the two types of material are so great that delamination can occur.

It is an object of the present invention to provide an improved armour.

According to the present invention there is provided an armour comprising a composite material consisting of a mixture of hard particulate material and fibrous material dispersed throughout a matrix material, the distribution of the particulate and fibrous materials through the matrix material being such that the properties of the composite material change progressively from predominantly hard at one surface to predominantly resilient at another surface.

The most convenient way of achieving a progressive change in properties is to prepare a plurality of sheets of material, the compositions of which vary so far as the ratio of particulate to fibrous materials is concerned, to stack the sheets and then to hot press them at a temperature sufficient to cause the matrix material to flow, so as to form a unified void-free composite material, the properties of which vary progressively throughout the material from predominantly hard at one surface to predominantly resilient at another surface.

In a preferred form of the invention, the particulate material is a ceramic and the matrix material is a glass. Suitable ceramic materials are silicon carbide, boron carbide, and silicon nitride. The glass matrix material may be a common glass, low melting point soldering glass, a boro-silicate glass, or a nucleating glass. The fibrous material may be a ceramic material in whisker form, whiskers of metal oxides such as aluminium or magnesia, carbon fibres or even metal wires, if it is desired to impart a measure of ductility into the characteristics of the armour. If ceramic whiskers are used, these can be the same as the ceramic particles, but in any event the ceramic materials already mentioned are suitable. The fibrous and matrix materials should be so chosen that the thermal coefficients of expansion are as nearly as possible the same. Desirably the same criteria should also apply to the particulate material but it is not so important. Particularly suitable glasses for the matrix material are the boro-silicate glass, known by the trade name Pyrex which has the following composition:

| | |
|---|---|
| Silica | 80.2 % w/w |
| Boron oxide | 12.3 % w/w |
| Alumina | 2.6 % w/w |
| Calcia | 0.1 % w/w |
| Sodium Oxide | 4.5 % w/w |
| Potassium oxide | 0.3 % w/w | and the nucleating glass known by the trade name Corning type 9608 which has the following composition:

| | |
|---|---|
| Silicon dioxide | 69.5 % w/w |
| Alumina | 17.8 % w/w |
| Magnesia | 2.8 % w/w |
| Lithium oxide | 2.5 % w/w |
| Titania | 4.75% w/w |
| Zirconia | 0.25% w/w |
| Zinc oxide | 1.0 % w/w |
| Sodium oxide | 0.4 % w/w |
| Arsenic trioxide | 1.0 % w/w |

An embodiment of the invention will now be described, by way of example, with reference to the accompanying drawing.

A sheet of armour embodying the invention consists of a plurality of layers 1 of material each of which consists of a mixture of ceramic particles 2 and carbon fibres 3 embedded in a glass matrix 4 which is continuous throughout the thickness of the armour, thus binding the individual layers 1 into a single body. The relative proportion of ceramic particles 2 to carbon fibres 3 in each layer 1 varies throughout the thickness of the armour so as to provide a graduated change from hardness at one surface (a higher proportion of particles) to toughness at the opposite surface (a higher proportion of carbon fibres).

The sheet of armour can be made by stacking together a plurality of sheets of material each of which consists of an appropriate mixture of ceramic particles, carbon fibres, a glass binder in powder form and a temporary binder such as polyvinyl acetate dissolved in methyl ethyl ketone, and hot-pressing the sheets together at a temperature and pressure sufficient to cause the glass binder to flow to form a void-free matrix throughout which are dispersed the hard particles and the carbon fibres. The temporary binder is burnt out during the hot-pressing operation.

Many types of glass can be used the choice depending on a number of factors such as the manufacturing techniques used or the use to which the armour is to be put. For example, for hot pressing it is desirable that the glass should have the lowest melting point which is practicable, and also a high fluidity. On the other hand the physical properties of the final composite material are dependent upon those of the glass. It may therefore be advisable to choose a boro-silicate glass such as that having the composition:

| | |
|---|---|
| Silica | 80.2 % w/w |
| Boron oxide | 12.3 % w/w |
| Alumina | 2.6 % w/w |
| Calcia | 0.1 % w/w |
| Sodium oxide | 4.5 % w/w |
| Potassium oxide | 0.3 % w/w | which has a coefficient of thermal expansion close to that of carbon fibres. Alternatively, if the armour is to be used in arduous conditions it may be desirable to choose a glass which has a high strength and hardness at elevated temperatures such as a nucleated glass, for example, that which has the following composition:

| | |
|---|---|
| Silicon dioxide | 69.5 % w/w |
| Alumina | 17.8 % w/w |
| Magnesia | 2.8 % w/w |
| Lithium oxide | 2.5 % w/w |
| Titania | 4.75 % w/w |
| Zirconia | 0.25 % w/w |
| Zinc oxide | 1.0 % w/w |
| Sodium oxide | 0.4 % w/w |
| Arsenic trioxide | 1.0 % w/w |

In both cases, the temperature and pressures at which the hot pressing is carried out are determined by the physical properties of the glass. In addition, care must be taken to ensure that the fibres are not damaged during.

To achieve the extreme hardness required by the sheets which are to form the hard front surface of the armour, the mixture from which the appropriate sheets are made must contain a high proportion of the hard ceramic particles, and to achieve this high density steps have to be taken to ensure proper packing of the particles. This can be done by using particles which have a range of discrete dimensions such that the smaller particles fit into the voids between the larger ones. The proper particle sizes and the relative volume proportions required to achieve given packing densities are recorded in the literature for a variety of particle shapes. The mix containing the proper sizes and proportions of hard particles, together with just sufficient volume of glass powder to fill the residual porosity of the hard particles is made up with a suitable binder to form a slurry. The slurry is fed under a doctor blade on to a moving carrier as described in our co-pending British application No. 16047/68, but in the present case, either the carrier or the slurry is mechanically agitated in the region of the deposition of the sheet so as to cause the various sizes of particles to adopt the dense packing desired. The agitation may be achieved either by positioning an ultrasonic transducer within a trough through which the slurry flows or by supporting the moving carrier at the point of emergence of the slurry from the doctor blade upon a vibrating plate or table. The hardness of subsequent sheets is reduced by decreasing the proportion of hard particles and by increasing the proportion of glass binder accordingly, and by increasing the proportion of reinforcing fibres 25 has already been described. The fibres can be separate and stirred into the slurry, or a tow of fibres can be passed through the slurry and under the doctor blade.

An alternative way of making the sheets, which is particularly suitable for those sheets in which there is to be a higher proportion of fibres, is to pass a continuous tow of carbon fibres through a series of spreading rollers so as to spread the fibres into a tape, and then to pass the tape through a bath of a slurry of the ceramic and glass particles. In addition further slurry can be sprayed onto the surfaces of the tape. After the tape has been impregnated with slurry, excess slurry is removed by means of further rollers, and the tape is dried before being wound onto rollers. The composition of the sheets can be controlled by varying the proportions of ceramic particles, glass particles and binder solution in the slurry. This method of forming the "green" sheets of material is particuarly suited to producing a composite material containing straight, well aligned fibres, thus making the maximum use of the properties of the fibres. It is also possible to make the properties of the armour directional in its properties or isotropic by aligning the fibres in successive sheets or not, as the case may be.

In practice the final armour may include sheets of material made by both of the above methods because the first method is more appropriate to the manufacture of those sheets containing a high proportion of ceramic particles, and vice versa.

I claim:

1. An armour comprising a composite material consisting of a mixture of hard particulate material and fibrous material dispersed throughout a matrix material, the distribution of the particulate and fibrous materials through the matrix material being such that the properties of the composite material change progressively from predominantly hard at one surface to predominantly resilient at another surface.

2. An armour according to claim 1 wherein the matrix material is a glass.

3. An armour according to claim 2 wherein the glass is selected from the group comprising nucleating glasses and borosilicate glasses.

4. An armour according to claim 1 wherein the particulate material is a ceramic material.

5. An armour according to claim 4 wherein the ceramic material is selected from the group comprising silicon carbide, boron carbide and silicon nitride.

6. An armour according to claim 1 wherein the fibrous material is carbon fibre.

7. An armour according to claim 1 wherein the fibrous material is a ceramic material in whisker form.

8. An armour according to claim 1 wherein the fibrous material is a metal oxide in whisker form.

9. An armour according to claim 1 wherein the fibrous material is metal wires.

10. A method of manufacturing an armour as claimed in claim 1 comprising the operations of stacking together a plurality of sheets of composite material having differing proportions of particulate and fibrous materials dispersed in the matrix material in such a manner that the relative proportions of particulate and fibrous materials vary throughout the stack, and hot pressing at a temperature sufficient to cause the matrix material to flow so as to form a unified void-free composite material the properties of which vary progressively throughout the material from predominantly hard at one surface to predominantly resilient at another surface.

* * * * *